United States Patent

Hamamoto et al.

[11] Patent Number: 6,045,945
[45] Date of Patent: Apr. 4, 2000

[54] ELECTROLYTE SOLUTION FOR LITHIUM SECONDARY BATTERY

[75] Inventors: Toshikazu Hamamoto; Atsuo Hitaka; Koji Abe; Yohsuke Ueno; Noriyuki Ohira; Masahiko Watanabe, all of Ube, Japan

[73] Assignee: Ube Industries, Ltd., Ube, Japan

[21] Appl. No.: 09/046,964

[22] Filed: Mar. 24, 1998

[30] Foreign Application Priority Data

Mar. 25, 1997 [JP] Japan .................................... 9-072233
Mar. 25, 1997 [JP] Japan .................................... 9-072235

[51] Int. Cl.$^7$ ........................... H01M 10/40; H01M 6/04
[52] U.S. Cl. ......................... 429/200; 429/330; 429/331; 429/332; 429/333
[58] Field of Search .................... 429/200, 330, 429/331, 332, 333

[56] References Cited

U.S. PATENT DOCUMENTS 4,840,858   6/1989   Furukawa et al. ...................... 429/330

FOREIGN PATENT DOCUMENTS

| 3136161 | 3/1983 | Germany ............................ 429/200 |
| 5-74485 | 3/1993 | Japan . |
| 7-211349 | 8/1995 | Japan . |
| 8-325208 | 12/1996 | Japan . |

*Primary Examiner*—Stephen Kalafut
*Attorney, Agent, or Firm*—Burgess, Ryan & Wayne

[57] ABSTRACT

An electrolyte solution for a lithium secondary battery comprises a nonaqueous solvent and a fluorine-containing electrolyte capable of dissociating into lithium ions, wherein the content of HF in the electrolyte solution is less than 30 ppm.

8 Claims, No Drawings

ELECTROLYTE SOLUTION FOR LITHIUM SECONDARY BATTERY

BACKGROUND OF THE INVENTION

1. Field of the Invention

The present invention relates an electrolyte solution for a lithium secondary battery capable of forming a lithium secondary battery superior particularly in cycle characteristics and also superior in battery characteristics such as electrical capacity, storage stability.

2. Description of the Related Art

As the electrolyte solution for a lithium secondary battery, a nonaqueous electrolyte solution comprised of a solvent such as a cyclic carbonate, chain carbonate, ether, and a fluorine-containing electrolyte such as $LiPF_6$ dissolved therein since it is suitable for obtaining a high voltage and high capacity battery.

However, a lithium secondary battery using such a nonaqueous electrolyte solution is not always satisfactory in terms of the battery characteristics such as cycle characteristics, electrical capacity, storage stability. An electrolyte solution for a lithium secondary battery which is superior in cycle characteristics and which does not cause the battery performance to decrease is desired.

Various methods have been proposed to improve the battery characteristics. For example, Japanese Unexamined Patent Publication (Kokai) No. 7-211349 discloses a method which treats a nonaqueous electrolyte solution, in which a fluorine-containing electrolyte is dissolved, with a fluorine adsorbent, that is, metal oxides such as MgO to make the content of the free acid (e.g. HF) 20 to 25 ppm. In the past, however, it has been known that a reaction of a metal oxide and HF causes the production of a metal fluoride and water. Further, it is known that water reacts with fluorine-containing electrolytes such as $LiPF_6$, $LiBF_4$, $LiAsF_6$ to produce HF. Therefore, in the method of this publication, there is the concern that the reaction will cause the production of water, the hydrolysis reaction of the produced water and the $LiPF_6$ in the electrolyte will again produce HF, and the amount of HF in the nonaqueous electrolyte solution will once again increase along with the elapse of time. Thus, there is a need for a further superior lithium secondary battery.

On the other hand, as a method for removing the diols from cyclic carbonate, there is known the adsorption method using an adsorbent such as silica gel, active carbon, activated alumina, or a molecular sieve. For example, Japanese Unexamined Patent Publication (Kokai) No. 5-74485 discloses a solution containing a cyclic carbonate as a solvent for a nonaqueous electrolyte. For making the concentration of the diols in the nonaqueous electrolyte solution a low one of not more than 1500 ppm, it describes a method of distillation of the cyclic carbonate and a method of treatment by an adsorbent. Further, a method of bringing a cyclic carbonate containing diols as impurities into contact with synthetic zeolite in the presence of a chain carbonate to remove the diols in the cyclic carbonate has been reported. That is, Japanese Unexamined Patent Publication (Kokai) No. 8-325208 describes a method of reacting ethylene glycol and a chain carbonate by zeolite in the copresence of a cyclic carbonate and chain carbonate to cause the production of a monoalcohol and removing that alcohol by a molecular sieve.

SUMMARY OF INVENTION

In view of the problem of the known electrolyte solution for lithium secondary batteries explained above, the objects of the present invention are to provide an electrolyte solution for a lithium secondary battery capable of forming a lithium secondary battery which reduces the amount of HF in the electrolyte solution comprised of the nonaqueous solvent and the fluorine-containing electrolyte and is superior in battery characteristics, particularly in cycle characteristics.

In accordance with the present invention, there is provided an electrolyte solution for a lithium secondary battery comprising a nonaqueous solvent and a fluorine-containing electrolyte capable of dissociating into lithium ions, wherein HF is contained in the electrolyte solution in a content of less than 30 ppm.

In accordance with the present invention, there is also provided an electrolyte solution for a lithium secondary battery comprising a nonaqueous solvent having an alcohol content of less than 50 ppm and a fluorine-containing electrolyte capable of dissociating into lithium ions, wherein HF is contained in the electrolyte solution in a content of less than 30 ppm.

In accordance with the present invention, there is further provided an electrolyte solution for a lithium secondary battery comprising a nonaqueous solvent having a diol content of less than 20 ppm and a fluorine-containing electrolyte capable of dissociating into lithium ions, wherein HF is contained in the electrolyte solution in a content of less than 30 ppm.

In accordance with the present invention, there is still further provided an electrolyte solution for a lithium secondary battery comprising a nonaqueous solvent having a monoalcohol content of less than 30 ppm and a fluorine-containing electrolyte capable of dissociating into lithium ions, wherein HF is contained in the electrolyte solution in a content of less than 30 ppm.

DETAILED DESCRIPTION OF PREFERRED EMBODIMENTS

In the first aspect of the present inventors, considering the fact that when the content of HF in the electrolyte solution becomes greater, the cycle characteristics of the lithium secondary battery are reduced and, further, battery characteristics such as the electrical capacity, storage stability also are reduced, studied how to reduce the content of HF in a fluorine-containing electrolyte, such as the commercially available $LiPF_6$, in which 100 to 1000 ppm or so of HF is contained, and, further, conducted intensive studies on how to improve the cycle characteristics.

As a result, we found that, even when using a fully purified fluorine-containing electrolyte, HF is newly produced not only by the action of the slight amount of moisture contained in the high dielectric constant solvent such as ethylene carbonate and a low viscosity solvent such as dimethyl carbonate, but also by the slight amount of impurities and that the content of HF in the electrolyte solution prepared to a predetermined concentration increases along with time, whereby the cycle characteristics are caused to deteriorate.

The present invention relates to an electrolyte solution for a lithium secondary battery containing a nonaqueous solvent and a fluorine-containing electrolyte capable of dissociating into lithium ions, wherein the electrolyte solution for a lithium secondary battery contains HF in a content of less than 30 ppm.

In the second aspect of the present invention, considering the fact that when the content of HF in the electrolyte solution becomes greater, the cycle characteristics of the lithium secondary battery are reduced and, further, battery characteristics such as the electrical capacity, storage stability, also are reduced, engaged in intensive studies on how to reduce the content of HF in an electrolyte solution.

As a result, we found that the diols and monoalcohols contained in the high dielectric constant solvent such as ethylene carbonate and a low viscosity solvent such as dimethyl carbonate gradually react with the fluorine-containing electrolyte at ordinary temperature to produce HF and found that accordingly the HF in the electrolyte solution increased along with time, whereby the cycle characteristics of the battery are caused to deteriorate and thereby completed the invention.

The present invention relates to an electrolyte solution for a lithium secondary battery comprising a nonaqueous solvent containing less than 50 ppm alcohols and a fluorine-containing electrolyte capable of dissociating into lithium ions, wherein the electrolyte solution for a lithium secondary battery containing HF in an amount of less than 30 ppm.

The nonaqueous solvent used in the present invention is preferably comprised of a high dielectric constant solvent and a low viscosity solvent.

As the high dielectric constant solvent, for example, cyclic carbonates such as ethylene carbonate (EC), propylene carbonate (PC), butylene carbonate (BC), may be preferably mentioned. These high dielectric constant solvents may be used alone or may be used in combinations of two types or more.

As the low viscosity solvent, for example, chain carbonates such as dimethyl carbonate (DMC), methylethyl carbonate (MEC), diethyl carbonate (DEC), ethers such as tetrahydrofuran, 2-methyltetrahydrofuran, 1,4-dioxane, 1,2-dimethoxyethane, 1,2-diethoxyethane, 1,2-dibutoxyethane, lactones such as γ-butyrolactone, nitriles such as acetonitrile, esters such as methyl propionate, amides such as dimethylformamide may be mentioned. These low viscosity solvents may be used alone or may be used in combinations of two types or more.

The high dielectric constant solvent and low viscosity solvent are each freely selected and used combined with each other. Note that the high dielectric constant solvent and low viscosity solvent are used in a ratio of volume (high dielectric constant solvent:low viscosity solvent) of preferably 1:9 to 4:1, more preferably 1:4 to 7:3.

As the fluorine-containing electrolyte capable of dissociating into lithium ions used in the present invention, for example, a fluorophosphate such as $LiPF_6$, a fluoroborate such as $LiBF_4$, a fluoroarsenate such as $LiAsF_6$, or a triflate such as $LIOSO_2CF_3$, etc. may be mentioned. At least one type of these electrolytes is selected and used. These fluorine-containing electrolytes are used dissolved in the above nonaqueous solvent in concentrations of usually 0.1 to 3M, preferably 0.5 to 1.5M.

In the first aspect of the present invention, the electrolyte for a lithium secondary battery of the present invention preferably contains the above nonaqueous solvent and a fluorine-containing electrolyte capable of dissociating into lithium ions wherein the HF in the electrolyte is less than 30 ppm, preferably less than 20 ppm, particularly preferably less than 15 ppm.

The materials to be used in the present invention were purified by the following methods to remove the moisture and a slight amount of impurities. The commercially available high dielectric constant solvent and low viscosity solvent constituting the nonaqueous solvent are preferably those which were crystallized in the case of materials like ethylene carbonate which are solid at ordinary temperature or are preferably ones which were distilled by a reflux ratio of 0.01 to 300 and a theoretical number of plates of 5 to 90 in the case of materials like diethyl carbonate which are liquid at ordinary temperature. The crystallization is preferably performed using a solvent such as acetonitrile, acetone, and toluene. The conditions of the rectification differ depending on the purity of the commercially available material used, but the purification is preferably performed under the above ordinary conditions. Note that when purifying a commercially available material, it is possible to use rectification in place of crystallization and it is possible to perform the crystallization, then rectification.

Next, the high dielectric constant solvent and low viscosity solvent constituting the nonaqueous solvent are preferably purified by an adsorbent such as Molecular Sieves 4A (product name, same below) 4A and/or Molecular Sieves 5A, respectively, to remove the moisture and the slight amount of impurities.

After the high dielectric constant solvent and low viscosity solvent are blended to a predetermined ratio, the mixture may be further purified by purification with an adsorbent such as Molecular Sieves 4A and/or Molecular Sieves 5A in the same way as above to remove the slight amount of moisture and the slight amount of impurities.

In the nonaqueous solvent treated with the adsorbent in the above way, a fluorine-containing electrolyte such as $LiPF_6$ is dissolved to a predetermined concentration. The fluorine-containing electrolyte such as $LiPF_6$ is preferably purified before use by warming under a vacuum (30° C. to 50° C., 1 to 10 hours).

Next, a detailed explanation will be given of a specific method for purifying the nonaqueous solvent. The high dielectric constant solvent and the low viscosity solvent are purified by similar methods respectively.

As the adsorbent which may be used in the purification, silica gel, alumina, active carbon, Molecular Sieves 4A, Molecular Sieves 5A, etc. may be mentioned. As the contact method, the method of continuous feeding of the nonaqueous solvent (hereinafter called the "continuous method") and the method of adding the adsorbent to the nonaqueous solvent and then allowing the mixture to stand or stirring the same (hereinafter called the "batch method") may be mentioned.

In the case of the continuous method, the contact time is preferably 0.1 to 4/hour in terms of liquid hourly space velocity (LHSV). Further, the contact temperature is preferably 10° C. to 60° C. In the case of the batch method, it is preferable to add 0.1 to 30% by weight to the nonaqueous solvent and perform treatment for 0.5 to 24 hours. When there is a large amount of trace impurities contained in the nonaqueous solvent, the distillation or crystallization may be repeated or the residence time or contact time in the adsorption method may be made longer to ensure sufficient purification and make the content of the HF in the electrolyte less than 30 ppm.

When the Molecular Sieves 4A is used among the adsorbents, the selective adsorption ability of moisture or the impurities is high and the adsorption breakthrough time is long, so this adsorbent is preferable.

The purifying methods and the purifying conditions differ according to the types and the purities of the materials used, but it is necessary to remove the alcohol and other impurities contained in the high dielectric constant solvent or low viscosity solvent as much as possible and to purify and remove the HF contained in the electrolyte salt, that is, the $LiPF_6$ or other fluorine-containing electrolyte. The amount of HF in the electrolyte solution for a lithium secondary battery prepared using these materials is less than 30 ppm. In particular, after preparing the electrolyte solution, there is almost no increase in the amount of HF in the electrolyte solution along with time. When the lithium secondary battery is formed, the cycle characteristics are improved.

In the second aspect of the present invention, the electrolyte solution for a lithium secondary battery of the present invention is comprised of a nonaqueous solvent and a fluorine-containing electrolyte capable of dissociating into lithium ions characterized in that the content of the alcohols in the nonaqueous solvent is less than 50 ppm, in particular, the diols are less than 20 ppm and the monoalcohols are less than 30 ppm, wherein the amount of HF in the electrolyte for a lithium secondary battery comprised of this nonaqueous solvent and fluorine-containing electrolyte is less than 30 ppm, preferably less than 20 ppm, particularly preferably less than 15 ppm.

The alcohols usable in the present invention include diols and monoalcohols. Examples of the diols are ethylene glycol, 1,2-propanediol, 1,3-propanediol, diethylene glycol, etc. Examples of the monoalcohols are methyl alcohol, ethyl alcohol, 1-propyl alcohol, etc.

These alcohols are included in trace amounts as an impurity in the cyclic carbonates or chain carbonates to be used as a non-aqueous solvent.

Namely, the cyclic carbonates are usually produced by the reaction of diols and chain carbonates or by the reaction of oxirane compounds (e.g., ethylene oxide, propylene oxide) and carbon dioxide. During these reactions, the starting diols remain in the resultant cyclic carbonates as a contaminate or the starting oxirane compounds are hydrolyzed to the corresponding diols, which then remain in the resultant cyclic carbonates as a contaminate. On the other hand, the chain carbonates are usually produced by the reaction of monoalcohols and carbon dioxide, by the reactions of monoalcohols and phosgene, or by alcoholysis reactions of monoalcohols and the other chain carbonates. In these reactions, the starting monoalcohols remain in the resultant chain carbonates as a contaminant. Furthermore, the cyclic carbonates and chain carbonates are reacted with water to form alcohols and carbon dioxide. Especially, cyclic carbonates are readily hydrolyzed when contacted with trace amounts of water. Due to the above-mentioned various reasons, it is the actual circumstances that the cyclic carbonates and chain carbonates inevitably contain trace amounts of alcohols as an impurity.

The materials to be used in the present invention were purified by the following methods to remove the alcohols. The commercially available high dielectric constant solvent and low viscosity solvent constituting the nonaqueous solvent are preferably those which were crystallized in the case of materials such as ethylene carbonate which are solid at ordinary temperature or are preferably ones which were distilled by a reflux ratio of 0.01 to 300 and a theoretical number of plates of 5 to 90 in the case of materials such as diethyl carbonate which are liquid at ordinary temperature. The crystallization is preferably performed using a solvent such as acetonitrile, acetone, and toluene. The conditions of the rectification differ depending on the purity of the commercially available material used, but the purification is preferably performed under the above ordinary conditions. Note that when purifying a commercially available material, it is possible to use rectification in place of crystallization and it is possible to perform the crystallization, then rectification.

Next, the high dielectric constant solvent and low viscosity solvent constituting the nonaqueous solvent are preferably purified by an adsorbent such as Molecular Sieves (product name, same below) 4A and/or Molecular Sieves 5A, respectively, to remove the alcohols.

After the high dielectric constant solvent and low viscosity solvent are blended to a predetermined ratio, the mixture may be further purified by purification with an adsorbent such as Molecular Sieves 4A and/or Molecular Sieves 5A in the same way as above to remove the alcohols.

In the nonaqueous solvent treated with the adsorbent in the above way, a fluorine-containing electrolyte such as $LiPF_6$ is dissolved to a predetermined concentration.

Next, a detailed explanation will be given of a specific method for purifying the nonaqueous solvent. The high dielectric constant solvent and the low viscosity solvent are purified by similar methods respectively.

As the adsorbent which may be used in the purification, silica gel, alumina, active carbon, Molecular Sieves 4A, Molecular Sieves 5A, etc. may be mentioned. As the contact method, the method of continuous feeding of the nonaqueous solvent (hereinafter called the "continuous method") and the method of adding the adsorbent to the nonaqueous solvent and then allowing the mixture to stand or stirring the same (hereinafter called the "batch method") may be mentioned.

In the case of the continuous method, the contact time is preferably 0.1 to 4/hour in terms of liquid hourly space velocity (LHSV). Further, the contact temperature is preferably 10° C. to 60° C. In the case of the batch method, it is preferable to add 0.1 to 30% by weight of absorbent to the nonaqueous solvent and perform treatment for 0.5 to 24 hours. When there is a large amount of alcohols contained in the nonaqueous solvent, the distillation or crystallization may be repeated or the residence time or contact time in the adsorption method may be made longer to ensure sufficient purification and make the content of the alcohol in the nonaqueous solvent less than 50 ppm. When the Molecular Sieves 4A is used among the adsorbents, the selective adsorption ability of alcohols is high and the adsorption breakthrough time is long, so this adsorbent is preferable.

The purifying methods and the purifying conditions differ according to the types of the materials used and the types and amounts of the alcohols contained in the same, so it is necessary to suitably select the suitable purifying method or purifying conditions. The content of the alcohol in the nonaqueous solvent prepared using these materials becomes less than 50 ppm while the content of the HF in the electrolyte solution comprised of the nonaqueous solvent and fluorine-containing electrolyte becomes less than 30 ppm. In particular, after preparing the electrolyte solution, there is almost no increase in the amount of HF in the electrolyte solution along with time. When the lithium secondary battery is formed, the cycle characteristics are improved.

A lithium secondary battery using the electrolyte solution for a lithium secondary battery of the present invention is excellent in cycle characteristics and further is superior in battery characteristics such as electrical capacity and storage stability.

The components of the lithium secondary battery other than the electrolyte solution are not particularly limited. Various components conventionally used may be used.

For example, as a cathode material (cathode active material), a composite metal oxide of at least one metal selected from the group comprised of chrome, vanadium, manganese, iron, cobalt, and nickel and lithium is used. As the composite metal oxide, $LiCoO_2$, $LiMn_2O_4$, $LiNiO_2$, etc. may be mentioned.

The cathode is fabricated by kneading the above cathode material with acetylene black, carbon black, or another electroconductivity agent and polytetrafluoroethylene (PTFE), polyvinylidene fluoride (PVDF), or another binder to make a cathode mixture, then rolling the cathode mixture on an aluminum or stainless steel foil or lath sheet serving as a charge collector and then warming the same at a temperature of 50 to 250° C. or so for about 2 hours under vacuum.

As an anode material (anode active material), lithium metal, a lithium alloy, and materials capable of Li intercalation and deintercalation such as a carboneous material (thermally cracked carbons, cokes, graphites, glassy carbons, sintered organic polymer compounds, carbon fiber, activated carbon, etc.) or tin composite oxides may be used. Note that a powder material such as a carbon material is kneaded with an ethylene propylene diene monomer (EPDM), polytetrafluoroethylene (PTFE), polyvinylidene fluoride (PVDF), or another binder for use as the anode mixture.

The structure of the lithium secondary battery is not particularly limited. A coin battery having a cathode, anode, and single or multiple separators, further, a cylindrical battery, prismatic battery, etc. having a cathode, anode, and roll-shaped separators may be mentioned as examples. Note that as a separator, a known microporous film, woven fabric, nonwoven fabric, etc. of a polyolefin is used.

EXAMPLES

The present invention will now be further explained in detail, but is by no means limited to the following Examples.

Example I-1

Preparation of Electrolyte

Commercially available EC Ethyl Carbonate was crystallized two times by acetonitrile, then treated by adsorption by Molecular Sieves 4A (50° C., LHSV; 1/hr). On the other hand, DMC dimethyl carbonate was fully rectified at a reflux ratio of 1 and a theoretical number of plates of 30, then treated by adsorption by Molecular Sieves 4A at an LHSV of 1/hr (25° C.). Thereafter, the nonaqueous solvent having a ratio of EC:DMC (volume ratio)=1:2 was prepared. Into this was dissolved $LiPF_6$ which had been warmed under vacuum (40° C. for 2 hours) to give a concentration of 0.8M. As a result, the amount of HF in the electrolyte solution after one day was 9 ppm. After 2 weeks, the amount of HF in the electrolyte solution was measured again, whereupon it was found to be 9 ppm or no change.

Fabrication of Lithium Secondary Battery and Measurement of Battery Characteristics $LiCoO_2$ (cathode active material) in an amount of 70% by weight, acetylene black (electroconductivity agent) in an amount of 20% by weight, and polytetrafluoroethylene (binder) in an amount of 10% by weight were mixed and then shaped by compression to fabricate a cathode. Natural graphite (anode active material) in an amount of 95% by weight and ethylene propylene diene monomer (binder) in an amount of 5% by weight were mixed and then molded by compression to prepare an anode. A separator of a polypropylene microporous film was used and impregnated with the above electrolyte solution to fabricate a coin battery (diameter 20 mm, thickness 3.2 mm).

This coin battery was used and repeatedly charged and discharged at room temperature (20° C.) by a constant current of 0.8 mA with potential restrictions of a charging voltage of 4.2V and a discharging voltage of 2.7V, whereupon the rate of maintenance of the discharging capacity after 100 cycles was 90%.

Example I-2

Commercially available EC and DMC were respectively rectified at a reflux ratio of 1 and a theoretical number of plates of 30, then were treated by adsorption by Molecular Sieves 4A at 50° C. for the EC and 25° C. for the DMC with LHSV for each of 2/hr. Next, a nonaqueous solvent of EC:DMC (volume ratio)=1:2 was prepared and treated by adsorption by Molecular Sieves 4A (25° C.) at an LHSV of 2/hr. Into this was dissolved $LiPF_6$ warmed under vacuum (40° C. for 2 hours) to a concentration of 0.8M. As a result, the amount of HF of the electrolyte solution after one day was 10 ppm and the amount after 2 weeks was 10 ppm. The electrolyte solution was used to prepare a coin type battery in the same way as Example I-1 which was repeatedly charged and discharged, whereupon the rate of maintenance of the discharge capacity after 100 cycles was found to be 89%.

Example I-3

Commercially available EC was crystallized once by acetonitrile, then treated by Molecular Sieves 5A (50° C., LHSV: 2/hr). On the other hand, DEC was fully rectified at a reflux ratio of 0.5 and a theoretical number of plates of 30, then treated by adsorption by Molecular Sieves 4A by an LHSV of 2/hr (25° C.). Next, a nonaqueous solvent of EC:DEC (volume ratio)=1:2 was prepared and treated (25° C.) by Molecular Sieves 4A with an LHSV of 2/hr. Into this was dissolved $LiPF_6$ warmed under vacuum (40° C. for 2 hours) to a concentration of 0.8M. As a result, the amount of HF of the electrolyte solution after one day was 12 ppm and the amount after 2 weeks was 12 ppm. The electrolyte solution was used to prepare a coin type battery in the same way as Example I-1 which was repeatedly charged and discharged, whereupon the rate of maintenance of the discharge capacity after 100 cycles was found to be 88%.

Example I-4

Commercially available EC and DMC were respectively rectified by a reflux ratio of 0.5 and a theoretical number of plates of 30. Next, a nonaqueous solvent of EC:DMC (volume ratio)=1:2 was prepared and treated by Molecular Sieves 5A (25° C. with an LHSV of 4/hr) and Molecular Sieves 4A (25° C. with an LHSV of 4/hr). Into this was dissolved $LiPF_6$ warmed under vacuum (40° C. for 2 hours) to a concentration of 0.8M. As a result, the amount of HF of the electrolyte solution after one day was 11 ppm and the amount after 2 weeks was 12 ppm. The electrolyte solution was used to prepare a coin type battery in the same way as Example I-1 which was repeatedly charged and discharged, whereupon the rate of maintenance of the discharge capacity after 100 cycles was found to be 87%.

Example I-5

Commercially available EC was treated by Molecular Sieves 4A (50° C., LHSV: 1/hr). On the other hand, DMC was rectified at a reflux ratio of 0.5 and a theoretical number of plates of 30, then treated by adsorption by Molecular Sieves 4A (25° C., LHSV: 1/hr). Next, a nonaqueous solvent of EC:DMC (volume ratio)=1:2 was prepared and treated by Molecular Sieves 4A (25° C., LHSV: 2/hr). Into this was dissolved $LiPF_6$ warmed under vacuum (40° C. for 2 hours) to a concentration of 0.8M. As a result, the amount of HF of the electrolyte solution after one day was 15 ppm and the amount after 2 weeks was 17 ppm. The electrolyte solution was used to prepare a coin type battery in the same way as Example I-1 which was repeatedly charged and discharged, whereupon the rate of maintenance of the discharge capacity after 100 cycles was found to be 85%.

Example I-6

Commercially available EC and DMC rectified at a reflux ratio of 0.5 and a theoretical number of plates of 30 were blended to give a nonaqueous solvent of EC:DMC (volume ratio)=1:2. This was treated by Molecular Sieves 5A (25° C., LHSV: 4/hr) and then by Molecular Sieves 4A (25° C., LHSV: 4/hr). Into this was dissolved $LiPF_6$ warmed under vacuum (40° C. for 2 hours) to a concentration of 0.8M. As a result, the amount of HF of the electrolyte solution after one day was 17 ppm and the amount after 2 weeks was 24 ppm. The electrolyte solution was used to prepare a coin type battery in the same way as Example I-1 which was repeatedly charged and discharged, whereupon the rate of maintenance of the discharge capacity after 100 cycles was found to be 80%.

Example I-7

Commercially available EC and 1,2-dimethoxyethane (DME) were respectively rectified at a reflux ratio of 0.7 and a theoretical number of plates of 30. Next, a nonaqueous solvent of EC:DME (volume ratio)=1:2 was prepared and treated by Molecular Sieves 5A (25° C., LHSV: 4/hr) and Molecular Sieves 4A (25° C., LHSV: 4/hr). Into this was dissolved $LiPF_6$ warmed under vacuum (40° C. for 2 hours) to a concentration of 0.8M. As a result, the amount of HF of the electrolyte solution after one day was 10 ppm and the amount after 2 weeks was 11 ppm. The electrolyte solution was used to prepare a coin type battery in the same way as Example I-1 which was repeatedly charged and discharged, whereupon the rate of maintenance of the discharge capacity after 100 cycles was found to be 89%.

Comparative Example I-1

Commercially available EC and DMC were mixed to prepare a nonaqueous solvent of EC:DMC (volume ratio)=1:2 which was then treated by Molecular Sieves 5A (25° C.). The LHSV was 5/hr. Into this was dissolved $LiPF_6$ to a concentration of 0.8M. As a result, the amount of HF of the electrolyte solution after one day was 51 ppm and the amount after 2 weeks was 78 ppm. The electrolyte solution was used to prepare a coin type battery in the same way as Example I-1 which was repeatedly charged and discharged, whereupon the rate of maintenance of the discharge capacity after 100 cycles was found to be 58%.

As explained above, according to the first aspect of the present invention, it is possible to provide an electrolyte solution for a lithium secondary battery capable of forming a lithium secondary battery superior particularly in cycle characteristics and further superior also in battery characteristics such as electrical capacity, storage stability.

Example II-1

Preparation of Electrolyte

Commercially available EC was crystallized two times by acetonitrile, then treated by adsorption by Molecular Sieves 4A (50° C., LHSV; 1/hr). On the other hand, DMC was fully rectified by a reflux ratio of 1 and a theoretical number of plates of 30, then treated by adsorption with Molecular Sieves 4A at an LHSV of 1/hr (25° C.). Thereafter, a nonaqueous solvent having a ratio of EC:DMC (volume ratio)=1:2 was prepared. At that time, neither diols nor monoalcohols were detected. Into this was dissolved $LiPF_6$ to give a concentration of 0.8M. As a result, the amount of HF in the electrolyte after one day was 10 ppm. After 2 weeks, the amount of HF in the electrolyte was measured again, whereupon it was found to be 10 ppm or no change.

Fabrication of Lithium Secondary Battery and Measurement of Battery Characteristics $LiCoO_2$ (cathode active material) in an amount of 70% by weight, acetylene black (electroconductivity agent) in an amount of 20% by weight, and polytetrafluoroethylene (binder) in an amount of 10% by weight were mixed and then shaped by compression to fabricate a cathode. Natural graphite (anode active material) in an amount of 95% by weight and ethylene propylene diene monomer (binder) in an amount of 5% by weight were mixed and then molded by compression to prepare an anode. A separator of a polypropylene microporous film was used and impregnated with the above electrolyte solution to fabricate a coin battery (diameter 20 mm, thickness 3.2 mm).

This coin battery was used and repeatedly charged and discharged at room temperature (20° C.) by a constant current of 0.8 mA with potential restrictions of a charging voltage of 4.2V and a discharging voltage of 2.7V, whereupon the rate of maintenance of the discharging capacity after 100 cycles was 90%.

Example II-2

Commercially available EC and DMC were respectively rectified at a reflux ratio of 1 and a theoretical number of plates of 30, then were treated by adsorption with Molecular Sieves 4A at 50° C. for the EC and 25° C. for the DMC with LHSV each of 2/hr. Next, a nonaqueous solvent of EC:DMC (volume ratio)=1:2 was prepared and treated by adsorption with Molecular Sieves 4A (25° C.) at an LHSV of 2/hr. At this time, the content of diols in the nonaqueous solvent was 2 ppm, the content of monoalcohols was 1 ppm, and the total content of alcohols was 3 ppm. Into this was dissolved $LiPF_6$ to a concentration of 0.8M. As a result, the amount of HF of the electrolyte solution after one day was 11 ppm and the amount after 2 weeks was 11 ppm. The electrolyte solution was used to prepare a coin type battery in the same way as Example II-1 which was repeatedly charged and discharged, whereupon the rate of maintenance of the discharge capacity after 100 cycles was found to be 88%.

Example II-3

Commercially available EC was crystallized once by acetonitrile, then treated by Molecular Sieves 5A (50° C., LHSV: 2/hr). On the other hand, DEC was fully rectified at a reflux ratio of 0.5 and a theoretical number of plates of 30, then treated by adsorption with Molecular Sieves 4A by an LHSV of 2/hr (25° C.). Next, a nonaqueous solvent of EC:DEC (volume ratio)=1:2 was prepared and treated with Molecular Sieves 4A (25° C., LHSV of 2/hr). At this time, the content of diols in the nonaqueous solvent was 3 ppm, the content of monoalcohols was 2 ppm, and the total content of alcohols was 5 ppm. Into this was dissolved $LiPF_6$ to a concentration of 0.8M. As a result, the amount of HF of the electrolyte solution after one day was 13 ppm and the amount after 2 weeks was 13 ppm. The electrolyte solution was used to prepare a coin type battery in the same way as Example II-1 which was repeatedly charged and discharged, whereupon the rate of maintenance of the discharge capacity after 100 cycles was found to be 87%.

Example II-4

Commercially available EC and DMC were respectively rectified by a reflux ratio of 0.5 and a theoretical number of plates of 30. Next, a nonaqueous solvent of EC:DMC (volume ratio)=1:2 was prepared and treated with Molecular Sieves 5A (25° C., LHSV of 4/hr) and Molecular Sieves 4A (25° C., LHSV of 4/hr). At this time, the content of diols in the nonaqueous solvent was 3 ppm, the content of monoalcohols was 3 ppm, and the total content of alcohols was 6 ppm. Into this was dissolved $LiPF_6$ to a concentration of 0.8M. As a result, the amount of HF of the electrolyte solution after one day was 13 ppm and the amount after 2 weeks was 14 ppm. The electrolyte solution was used to prepare a coin type battery in the same way as Example II-1 which was repeatedly charged and discharged, whereupon the rate of maintenance of the discharge capacity after 100 cycles was found to be 87%.

Example II-5

Commercially available EC was treated by Molecular Sieves 4A (50° C., LHSV: 1/hr). On the other hand, DMC was rectified at a reflux ratio of 0.5 and a theoretical number of plates of 30, then treated by adsorption with Molecular Sieves 4A (250, LHSV: 1/hr). Next, a nonaqueous solvent of EC:DMC (volume ratio)=1:2 was prepared and treated with Molecular Sieves 4A (25° C., LHSV: 2/hr). At this time, the content of diols in the nonaqueous solvent was 10 ppm, the content of monoalcohols was 11 ppm, and the total content of alcohols was 21 ppm. Into this was dissolved $LiPF_6$ to a concentration of 0.8M. As a result, the amount of HF of the electrolyte solution after one day was 16 ppm and the amount after 2 weeks was 18 ppm. The electrolyte solution was used to prepare a coin type battery in the same way as Example II-1 which was repeatedly charged and discharged, whereupon the rate of maintenance of the discharge capacity after 100 cycles was found to be 83%.

Example II-6

Commercially available EC and DMC rectified at a reflux ratio of 0.5 and a theoretical number of plates of 30 were blended to give a nonaqueous solvent of EC:DMC (volume ratio)=1:2. This was treated with Molecular Sieves 5A (25° C., LHSV: 4/hr) and then with Molecular Sieves 4A (25° C., LHSV: 4/hr). At this time, the content of diols in the nonaqueous solvent was 16 ppm, the content of monoalcohols was 19 ppm, and the total content of alcohols was 35 ppm. Into this was dissolved $LiPF_6$ to a concentration of 0.8M. As a result, the amount of HF of the electrolyte solution after one day was 18 ppm and the amount after 2 weeks was 25 ppm. The electrolyte solution was used to prepare a coin type battery in the same way as Example II-1 which was repeatedly charged and discharged, whereupon the rate of maintenance of the discharge capacity after 100 cycles was found to be 79%.

Example II-7

Commercially available EC and 1,2-dimethoxyethane (DME) were respectively rectified at a reflux ratio of 0.7 and a theoretical number of plates of 30. Next, a nonaqueous solvent of EC:DME (volume ratio)=1:2 was prepared and treated with Molecular Sieves 5A (25° C., LHSV: 4/hr) and Molecular Sieves 4A (25° C., LHSV: 4/hr). At this time, the content of diols in the nonaqueous solvent was 2 ppm, the content of monoalcohols was 0 ppm, and the total content of alcohols was 2 ppm. Into this was dissolved $LiPF_6$ a concentration of 0.8M. As a result, the amount of HF of the electrolyte solution after one day was 11 ppm and the amount after 2 weeks was 12 ppm. The electrolyte solution was used to prepare a coin type battery in the same way as Example II-1 which was repeatedly charged and discharged, whereupon the rate of maintenance of the discharge capacity after 100 cycles was found to be 88%.

Comparative Example II-1

Commercially available EC and DMC were mixed to prepare a nonaqueous solvent of EC:DMC (volume ratio)= 1:2 which was then treated with Molecular Sieves 5A (25° C.). The LHSV was 5/hr. At this time, the content of diols in the nonaqueous solvent was 40 ppm, the content of monoalcohols was 45 ppm, and the total content of alcohols was 85 ppm. Into this was dissolved $LiPF_6$ to a concentration of 0.8M. As a result, the amount of HF of the electrolyte solution after one day was 51 ppm and the amount after 2 weeks was 78 ppm. The electrolyte solution was used to prepare a coin type battery in the same way as Example II-1 which was repeatedly charged and discharged, whereupon the rate of maintenance of the discharge capacity after 100 cycles was found to be 58%.

As explained above, according to the second aspect of the present invention, it is further possible to provide an electrolyte solution for a lithium secondary battery capable of forming a lithium secondary battery superior particularly in cycle characteristics and further superior also in battery characteristics such as electrical capacity, storage stability.

We claim:

1. An electrolyte solution for a lithium secondary battery comprising a nonaqueous solvent and at least one fluorine-containing electrolyte capable of dissociating into lithium ions, selected from the group consisting of lithium fluorophosphates, lithium fluoroborates, lithium fluoroarsenates, and lithium tri-flates, wherein HF is contained in the electrolyte solution in of an amount less than 30 ppm.

2. an electrolyte solution for a lithium secondary battery comprising a nonaqueous solvent having an alcohol content of less than 50 ppm and at least one fluorine-containing electrolyte capable of dissociating into lithium ions, selected from the group consisting of lithium fluorophosphates, lithium fluoroborates, lithium fluoroarsenates, and lithium tri-flates, wherein HF is contained in the electrolyte solution in an amount less than 30 ppm.

3. An electrolyte solution for a lithium secondary battery comprising a nonaqueous solvent having a diol content of less than 20 ppm and at least one fluorine-containing electrolyte capable of dissociating into lithium ions, selected from the group consisting of lithium fluorophosphates, lithium fluoroborates, lithium fluoroarsenates, and lithium tri-flates, wherein HF is contained in the electrolyte solution in an amount of less than 30 ppm.

4. An electrolyte solution for a lithium secondary battery comprising a non-aqueous solvent having a mono-alcohol content of less than 30 ppm and at least one fluorine-containing electrolyte capable of dissociating into lithium ions, selected from the group consisting of lithium fluorophosphates, lithium fluoroborates, lithium fluoroarsenates, and lithium tri-flates, wherein HF is contained in the electrolyte solution in an amount less than 30 ppm.

5. An electrolyte solution for a lithium secondary battery as claimed in claim 1, wherein the nonaqueous solvent is composed of (a) at least one high dielectric constant solvent selected from the group consisting of cyclic carbonates and (b) at least one low viscosity solvent selected from the group consisting of chain carbonates, ethers, lactones, nitrites, esters and amides at a ratio in volume of (a):(b)=1:9 to 4:1.

6. an electrolyte solution for a lithium secondary battery as claimed in claim 2, wherein the non-aqueous solvent is composed of (a) at least one high dielectric constant solvent selected from the group consisting of cyclic carbonates and (b) at least one low viscosity solvent selected from the group consisting of chain carbonates, ethers, lactones, nitrites, esters and amides at a ratio in volume of (a):(b)=1:9 to 4:1.

7. an electrolyte solution for a lithium secondary battery as claimed in claim 3, wherein the non-aqueous solvent is composed of (a) at least one high dielectric constant solvent selected from the group consisting of cyclic carbonates and (b) at least one low viscosity solvent selected from the group consisting of chain carbonates, ethers, lactones, nitrites, esters and amides at a ratio in volume of (a):(b)=1:9 to 4:1.

8. An electrolyte solution for a lithium secondary batttery as claimed in claim 4, wherein the non-aqueous solvent is composed of (a) at least one high dielectric constant solvent selected from the group consisting of cyclic carbonates and (b) at least one low viscosity solvent selected from the group consisting of chain carbonates, ethers, lactones, nitrites, esters and amides at a ratio in volume of (a):(b)=1:9 to 4:1.

* * * * *